US010618694B2

(12) United States Patent
Usami et al.

(10) Patent No.: US 10,618,694 B2
(45) Date of Patent: Apr. 14, 2020

(54) HANDLE AND CONTAINER WITH HANDLE

(71) Applicant: NISSEI ASB MACHINE CO., LTD., Komoro-shi, Nagano (JP)

(72) Inventors: Masayuki Usami, Komoro (JP); Atsushi Nagasaki, Komoro (JP); Kazuhiro Horiuchi, Komoro (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 110 days.

(21) Appl. No.: 15/572,652

(22) PCT Filed: Apr. 27, 2016

(86) PCT No.: PCT/JP2016/063288
§ 371 (c)(1),
(2) Date: Nov. 8, 2017

(87) PCT Pub. No.: WO2016/181850
PCT Pub. Date: Nov. 17, 2016

(65) Prior Publication Data
US 2018/0170616 A1     Jun. 21, 2018

(30) Foreign Application Priority Data
May 8, 2015    (JP) .................................. 2015-095716

(51) Int. Cl.
*B65D 23/10*    (2006.01)
*B29C 49/30*    (2006.01)
(Continued)

(52) U.S. Cl.
CPC .............. *B65D 23/10* (2013.01); *B29C 49/20* (2013.01); *B29C 49/30* (2013.01); *B29C 49/36* (2013.01);
(Continued)

(58) Field of Classification Search
CPC ...... B65D 23/106; B65D 23/104; B65D 1/46; B65D 90/02; B65D 23/10; B65D 25/28; B29C 49/20
(Continued)

(56) References Cited

U.S. PATENT DOCUMENTS 4,964,522 A * 10/1990 Umetsu .................... B29C 49/20
                                                    215/383
5,819,966 A * 10/1998 Ota ........................ B65D 23/106
                                                    215/398
(Continued)

FOREIGN PATENT DOCUMENTS

JP    64-9135     1/1989
JP    5-20679     5/1993
(Continued)

OTHER PUBLICATIONS

International Search Report issued in corresponding International Application No. PCT/JP2016/063288, dated Jul. 26, 2016 (5 pages).

*Primary Examiner* — J. Gregory Pickett
*Assistant Examiner* — Tia Cox
(74) *Attorney, Agent, or Firm* — Finnegan, Henderson, Farabow, Garrett & Dunner, LLP

(57) ABSTRACT

A handle of the present invention is a handle configured to be attached on a side surface of a container body along an upward and downward direction of the container body, the handle including an elongated grip portion, an upper attachment arm provided on an upper side of the grip portion, and a lower attachment arm provided on a lower side of the grip portion, wherein on at least a part of a lower surface of a distal end side of the upper attachment arm, a first inclined surface is formed to be inclined toward A center portion of the grip portion, and on at least a part of an upper surface of a distal end side of the lower attachment arm, a second
(Continued)

inclined surface is formed to be inclined toward the center portion of the grip portion.

6 Claims, 7 Drawing Sheets

(51) Int. Cl.
  *B29C 49/36* (2006.01)
  *B29C 49/20* (2006.01)
  *B29K 67/00* (2006.01)
  *B29L 31/00* (2006.01)
(52) U.S. Cl.
  CPC .... *B65D 23/106* (2013.01); *B29C 2049/2039* (2013.01); *B29K 2067/003* (2013.01); *B29L 2031/7158* (2013.01)
(58) Field of Classification Search
  USPC ............... 220/770, 759; 16/430; 29/450; 215/396, 42, 382, 398
  See application file for complete search history.

(56) References Cited

U.S. PATENT DOCUMENTS

| | | | | |
|---|---|---|---|---|
| 6,012,597 | A * | 1/2000 | Nishihara | B65D 23/106 215/398 |
| 6,179,143 | B1 * | 1/2001 | Grob | B29B 11/04 215/398 |
| 6,444,158 | B1 * | 9/2002 | Grob | B29C 49/20 215/396 |
| 6,460,715 | B1 * | 10/2002 | Yonemori | B65D 23/106 215/396 |
| 2001/0042731 | A1 * | 11/2001 | Itokawa | B65D 23/106 215/398 |
| 2003/0006210 | A1 * | 1/2003 | Iizuka | B65D 23/106 215/398 |
| 2007/0045225 | A1 * | 3/2007 | Jhuang | B65D 23/106 215/398 |
| 2010/0187246 | A1 * | 7/2010 | Miura | B29C 49/20 220/771 |
| 2011/0315653 | A1 * | 12/2011 | Itokawa | B65D 23/106 215/382 |
| 2012/0298616 | A1 * | 11/2012 | Nakayama | B29C 49/20 215/396 |
| 2015/0328818 | A1 * | 11/2015 | Ogihara | B29C 49/20 215/383 |

FOREIGN PATENT DOCUMENTS

| | | |
|---|---|---|
| JP | 6263149 | 9/1994 |
| JP | 7-31626 | 6/1995 |
| JP | 3836625 | 10/2006 |
| JP | 4080604 B2 | 4/2008 |
| JP | 2008-179400 A | 8/2008 |
| JP | 5041227 B2 | 10/2012 |
| JP | 5082900 B2 | 11/2012 |
| WO | WO 2014/092135 A1 | 6/2014 |

* cited by examiner

FIG.7
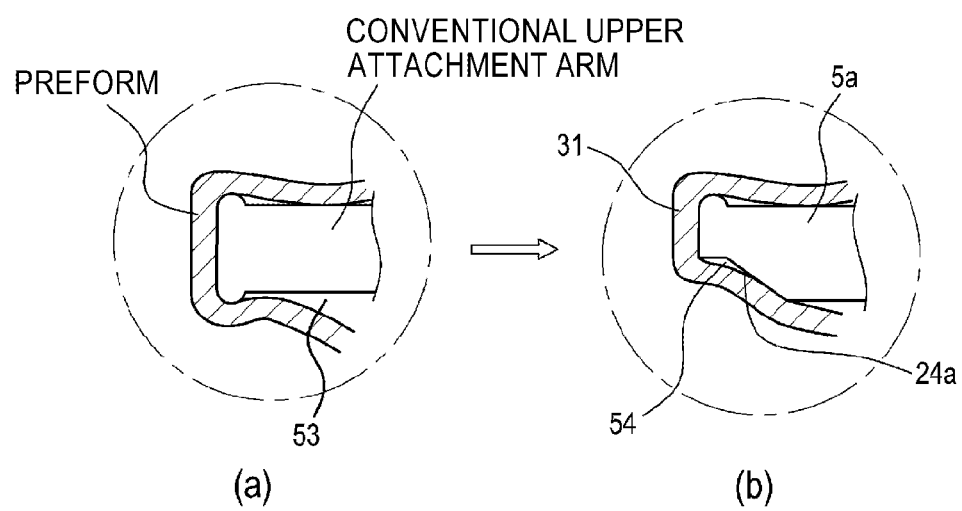
(a)            (b)
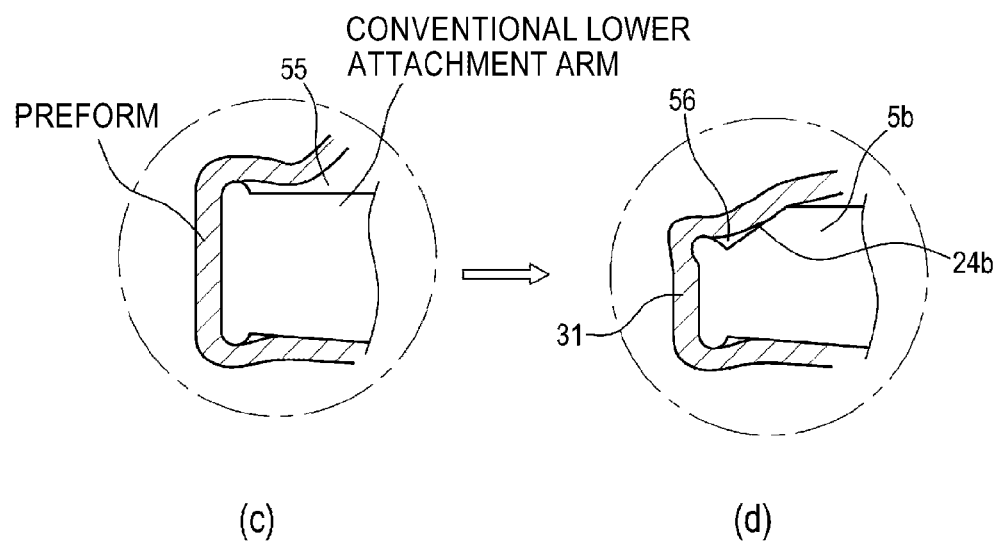
(c)            (d)

HANDLE AND CONTAINER WITH HANDLE

TECHNICAL FIELD

The present invention relates to a handle for a container with a handle, and also to a container with a handle.

BACKGROUND ART

Recently, large-capacity resin containers are widely used as containers for holding or transporting cooking oil, condiment, drinking water and the like. Such containers are increased in weight when filled with liquid such as cooling oil. Therefore, for the purpose of convenience of carrying or the like, many resin containers having a handle attached on a body of the container have been proposed (e.g., see Patent Documents 1 to 6).

For example, in Patent Document 1, a technology of enhancing an attachment strength of a handle to a container is disclosed. In Patent Document 1, two laterally facing protrusions (attachment portions) are provided on a distal end of a lower attachment arm of the handle, and preform resin which corresponds to the protrusions is inflated to become larger than the final container size and then an operation of pushing the inflated preform resin back to a position corresponding to the final container size is performed.

PRIOR ART REFERENCE

Patent Reference

Patent Document 1: International Publication No. WO 2014/092135
Patent Document 2: JP-UM-B-H05-020679
Patent Document 3: Japanese Patent No. 3836625
Patent Document 4: Japanese Patent No. 4080604
Patent Document 5: Japanese Patent No. 5041227
Patent Document 6: Japanese Patent No. 5082900

SUMMARY OF INVENTION

Problems to Be Solved

However, in the container with handle described in Patent Document 1, there are cases where wrinkles are generated on a portion of the pushed-back resin and thus when the container is dropped, there are cases where the container is broken starting from the wrinkles. Also, there are cases where a gap is created between an attachment arm of the handle and a side surface of the container, thereby decreasing an attachment strength in such portions.

Accordingly, an object of the present invention is to provide a handle and a container with a handle, in which it is possible to enhance an attachment strength of the handle to a container body and also to suppress occurrence of breaking of the container at the attachment portion.

Means for Solving the Problems

In order to achieve the above object, a handle of the present invention is a handle configured to be attached on a side surface of a container along an upward and downward direction of the container, the handle including: an elongated grip portion; an upper attachment arm provided on an upper side of the grip portion; and a lower attachment arm provided on a lower side of the grip portion, wherein on at least a part of a lower surface of a distal end side of the upper attachment arm, a first inclined surface is formed to be inclined toward a center portion of the grip portion, and wherein on at least a part of an upper surface of a distal end side of the lower attachment arm, a second inclined surface is formed to be inclined toward the center portion of the grip portion.

According to this configuration, for example, when the handle is attached on the container by blow-molding, it is possible to cause parts of a preform, which are being inflated by blowing, to be gradually attached to the upper and lower attachment arms along the first inclined surface of the upper attachment arm and the second inclined surface of the lower attachment arm. Therefore, gaps created between the handle (upper and lower attachment arms) and the container on the distal end sides of the upper and lower attachment arms can be reduced in size as compared with the conventional art. Accordingly, it is possible to enhance an attachment strength of the handle to the container. Also, the parts of the preform, which are being inflated by blowing, can be smoothly attached on the distal ends of the upper and lower attachment arms, and as a result, it is possible to suppress wrinkles from being generated on such attachment portions as compared with the conventional art.

In the handle of the present invention, it is preferable that a convex-shaped rib extending in a width direction of the lower attachment arm is provided on a lower surface side of the lower attachment arm.

According to this configuration, for example, when the handle is attached on the container by blow-molding, it is possible to reduce an influence of the preform, which is being inflated upward from a lower side of the lower attachment arm, on an attachment portion thereof by the convex-shaped rib. Therefore, the preform, which is being inflated toward the handle from the opposing direction, can be smoothly attached on the lower attachment arm, and as a result, it is possible to cause wrinkles to be hardly generated on a portion of the container attached on the lower attachment arm. Accordingly, it is possible to suppress occurrence of breaking of the container starting from the attachment portion. Further, since the container can be smoothly attached on the distal end portion of the lower attachment arm, a gap created between the lower attachment arm and the container can be reduced in size, thereby enhancing an attachment strength of the handle to the container.

Further, a container with a handle of the present invention is a container with handle including: a bottomed tubular container body; and the handle including: an elongated grip portion; an upper attachment arm provided on an upper side of the grip portion; and a lower attachment arm provided on a lower side of the grip portion, wherein on at least a part of a lower surface of a distal end side of the upper attachment arm, a first inclined surface is formed to be inclined toward a center portion of the grip portion, wherein on at least a part of an upper surface of a distal end side of the lower attachment arm, a second inclined surface is formed to be inclined toward the center portion of the grip portion, and wherein the distal end portions of the upper attachment arm and the lower attachment arm are engaged and integrated with a recess portion formed on a side surface of the container body by blow-molding.

According to this configuration, parts of a preform which are being inflated by blowing, are gradually attached to the upper attachment arm along the first inclined surface of the upper attachment arm and also gradually attached to the lower attachment arm along the second inclined surface of the lower attachment arm, thereby forming the container with the handle. Therefore, gaps created between the handle (upper and lower attachment arms) and the container body on the distal end portions of the upper and lower attachment arms can be reduced in size as compared with the conventional art. Accordingly, it is possible to enhance an attachment strength of the handle to the container body. Also, the parts of the preform, which are being inflated by blowing, can be smoothly attached on the distal end portions of the upper and lower attachment arms, and as a result, it is possible to suppress wrinkles from being generated on such attachment portions as compared with the conventional art.

In the container with the handle of the present invention, it is preferable that a convex-shaped rib extending in a width direction of the lower attachment arm is provided on a lower surface side of the lower attachment arm.

According to this configuration, it is possible to reduce an influence of the preform, which is being inflated upward from a lower side of the lower attachment arm by blowing, on an attachment portion thereof by the convex-shaped rib. Therefore, the container body, which is being inflated from directions other than the lower side, can be smoothly attached on the distal end portion of the lower attachment arm, and as a result, it is possible to cause wrinkles to be hardly generated on a portion of the container body attached on the distal end portion of the lower attachment arm. Accordingly, it is possible to suppress occurrence of breaking of the container starting from the attachment portion. Further, since the container body can be smoothly attached on the distal end portion of the lower attachment arm, a gap created between the lower attachment arm and the container body can be reduced in size, thereby enhancing an attachment strength of the handle to the container body.

In the container with the handle of the present invention, it is preferable that the container body and the handle are formed of a same resin material.

According to this configuration, since the container body and the handle are formed of the same resin material, it is possible to enhance recyclability of the container.

In the container with the handle of the present invention, preferably the upper attachment arm protrudes more toward a center side of the container body relative to the container body than the lower attachment arm.

According to the configuration, the container body, which is being inflated by blowing, comes in contact with the upper attachment arm protruding more than the lower attachment arm, and thereby it is possible to delay a timing at which the container body starts to come in contact with the lower attachment arm. Accordingly, a part of the preform, which is being inflated by blowing, can be easily smoothly attached on the lower attachment arm.

Advantageous Effects of Invention

According to the present invention, it is possible to enhance an attachment strength of the handle to the container body and also to suppress occurrence of breaking of the container at the attachment portion.

BRIEF DESCRIPTION OF DRAWINGS

FIGS. 7(*a*) to (*d*) are partially enlarged views comparing aspects in which the preform is attached to attachment arms of the handle.

MODE FOR CARRYING OUT THE INVENTION

Hereinafter, examples of the present embodiment will be described in detail with reference to the accompanying drawings.

Figure 1:
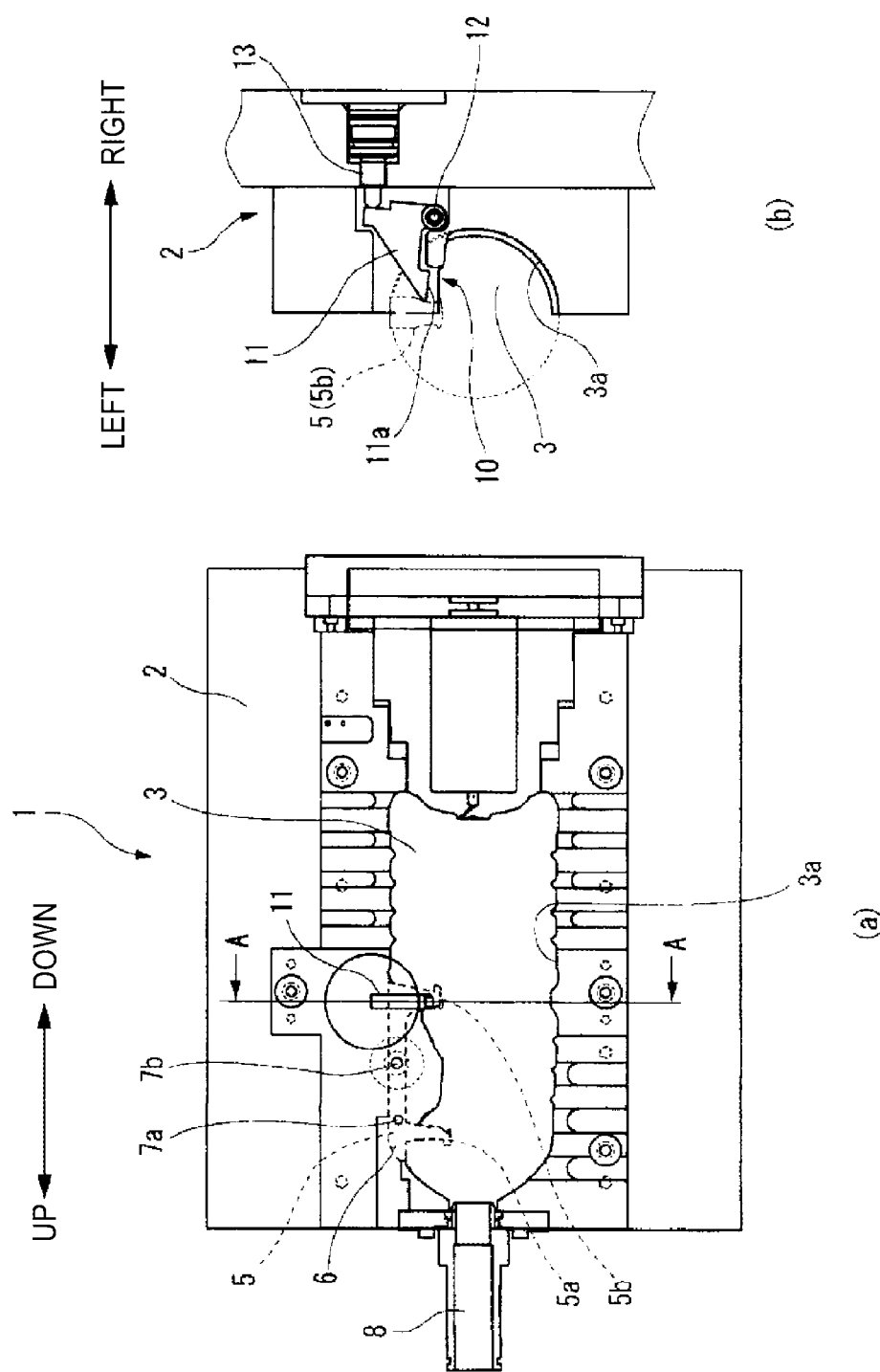
FIG. 1(*a*) is a view showing a mold for manufacturing a container with a handle according to the present invention, and FIG. 1(*b*) is a sectional view taken along a line A-A in FIG. 1(*a*).

As shown in FIG. 1, a mold for a container with a handle 1 for manufacturing a container with a handle has mold halves 2. The mold 1 for a container with a handle is configured by two mold halves 2 having similar structures. One of the mold halves 2 is shown in FIG. 1. In the mold half 2, a recess portion (cavity) 3 having a shape of a container part of the container with a handle is formed. The cavity 3 has an inner wall surface 3*a* for defining an outer shape of the container.

Where a direction of a mouth portion of the container (left direction in FIG. 1(*a*)) is referred to as an upper side, a handle arrangement portion 6, which is configured such that the handle 5 is arranged therein, is provided on an upper portion of the cavity 3. The handle arrangement portion 6 has a recessed shape following an outer shape of the handle 5 as described below. In FIG. 1(*a*), the outer shape of the handle 5 when the handle 5 is arranged in the handle arrangement portion 6 is shown by a broken line. When the handle 5 is arranged in the handle arrangement portion 6, distal end portions of upper and lower attachment arms 5*a*, 5*b* of the handle 5 are arranged in the cavity 3 of the mold half 2, i.e., to protrude inward relative to the inner wall surface 3*a* of the cavity 3. Also, a distal end surface of the upper attachment arm 5*a* is positioned to be closer to a center axis of the cavity 3 than a distal end surface of the lower attachment arm 5*b*. The handle arrangement portion 6 is provided with fixture pins 7*a*, 7*b* for fixing the handle. Further, an insertion portion 8 allowing a preform to be inserted therethrough is provided on the upper portion of the mold half 2.

In FIG. 1(*b*), the lower attachment arm 5*b* of the handle 5 arranged in the handle arrangement portion 6 is shown by a broken line. In the mold half 2, an open space 10, in which the inner wall surface 3*a* is not present, is formed around a location where the lower attachment arm 5*b* is arranged. The space 10 is a region in which the inner wall surface 3*a* defining the cavity 3 is partially absent on both right and left sides of the lower attachment arm 5*b*.

The mold half 2 is provided with a pressing member 11 configured to be rotatable about a rotation axis 12. On a rear surface (right surface in FIG. 1(*b*)) of the pressing member 11, a hydraulic piston member 13 capable of extending and retracting is provided to abut against the rear surface of the pressing member 11. The pressing member 11 is configured to be pushed by extension and retraction of the piston member 13 and thus to be rotated about the rotation axis 12.

The pressing member 11 has a pressing surface 11a formed on a distal end portion thereof. The pressing member 11 is shaped and positioned such that when the pressing member 11 is rotated about the rotation axis 12, the pressing surface 11a closes the space 10 formed around the lower attachment arm 5b of the handle 5. That is, the pressing member 11 and the space 10 have an insert structure in which the pressing surface 11a of the pressing member 11 is inserted into the space 10 to close the space 10.

When the pressing member 11 is not driven, the pressing member 11 is set such that the pressing surface 11a is arranged at a position, which is located outside the inner wall surface 3a. At this time, the piston member 13 is controlled in a retracted state. When viewing the mold half 2 from the lower side (when viewing from the direction in which FIG. 1(b) is taken), the pressing member 11 rotates about the rotation axis 12 in a clockwise direction and thus is maintained at a position where the pressing member 11 abuts against the piston member 13 as shown in FIG. 1(b).

In contrast, when the pressing member 11 is driven, the pressing member 11 is set such that the pressing surface 11a is arranged at a position forming a section of the inner wall surface 3a. At this time, the piston member 13 is controlled in an extended state. When viewing the mold half 2 from the lower side, the pressing member 11 is pushed by the extended piston member 13 and thus is rotated about the rotation axis 12 in a counterclockwise direction. As a result, the pressing member 11 is maintained at a position where the pressing surface 11a covers the space 10 formed around the lower attachment arm 5b. On the other hand, at this time, a pressing member 11 of the other mold half 2 is pushed by an extended piston member 13 and thus is rotated about a rotation axis 12 in a clockwise direction when viewing the mold half 2 from the lower side.

Figure 2:
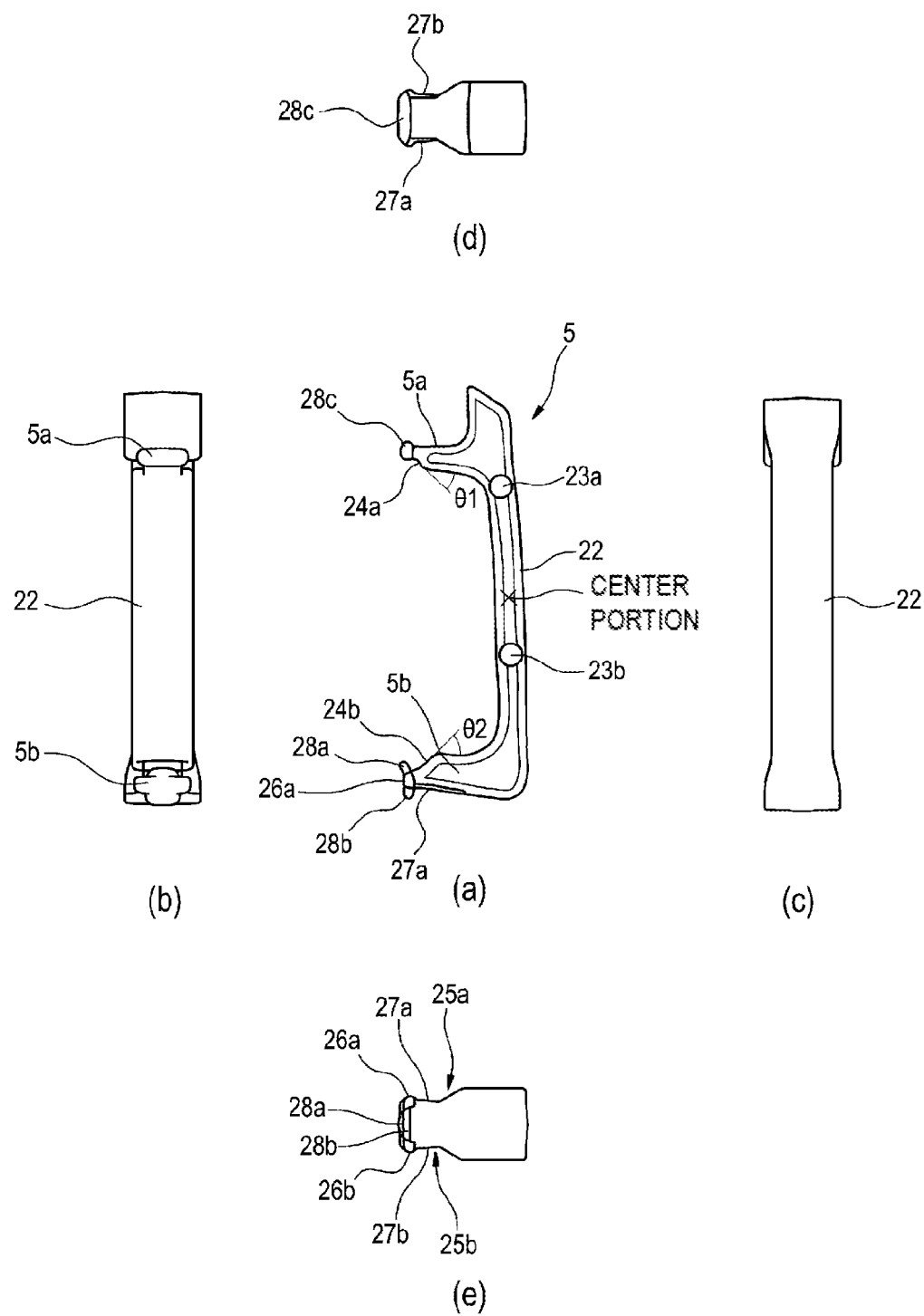
FIG. 2(*a*) is a front view of a handle to be attached on the container, FIG. 2(*b*) is a left side view of the handle, FIG. 2(*c*) is a right side view of the handle, FIG. 2(*d*) is a top view of the handle, and FIG. 2(*e*) is a bottom view of the handle.
Figure 3:
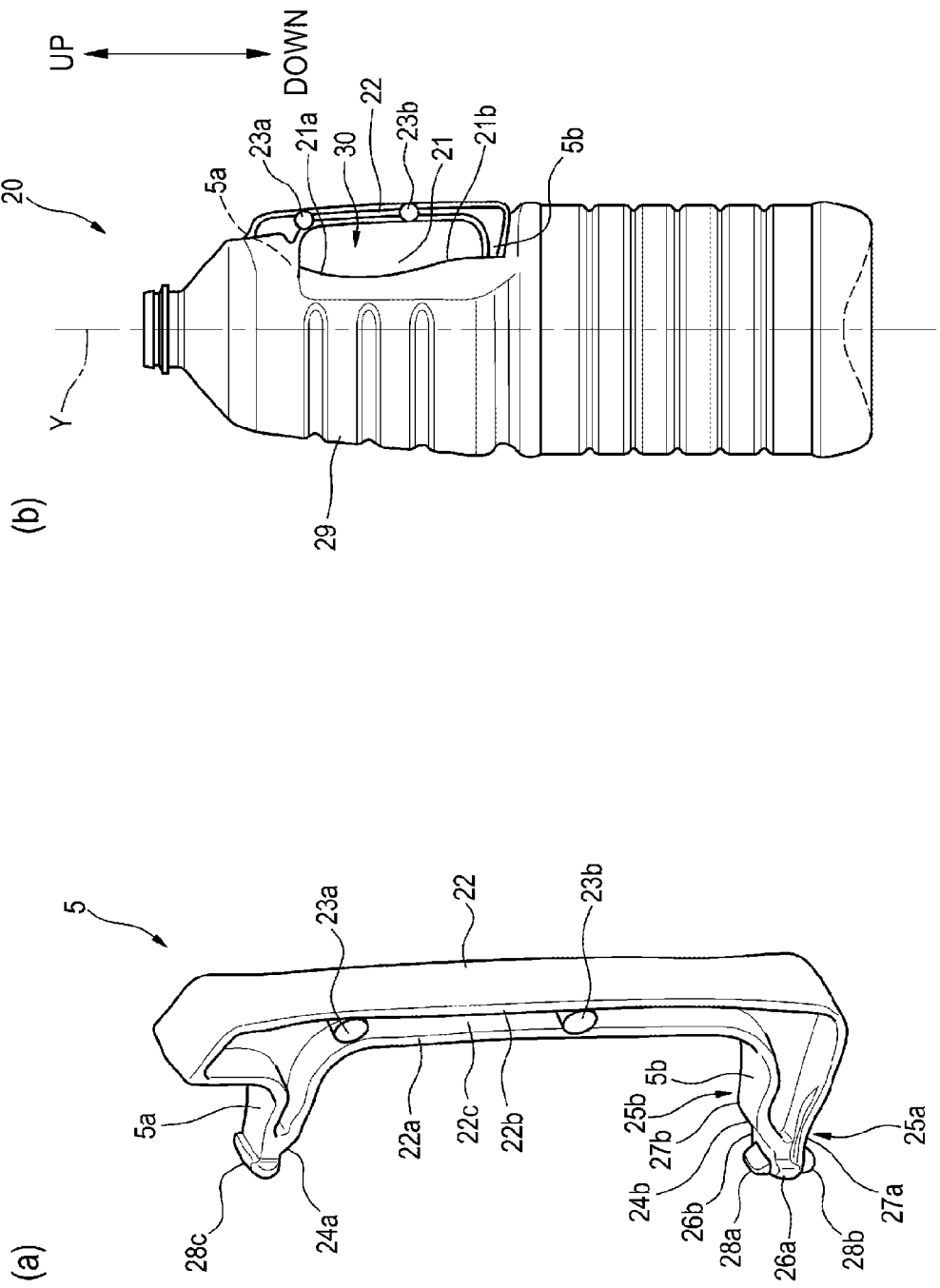
FIG. 3(*a*) is a perspective view of the handle to be attached on the container, and FIG. 3(*b*) is a view showing the container with the handle.

As shown in FIGS. 2 and 3, the handle 5 of the container with a handle 20 includes a grip portion 22, the upper attachment arm 5a and the lower attachment arm 5b. Also, the handle 5 has a structure in which a first plate piece 22a and a second plate piece 22b, which are arranged side by side, are connected by an intermediate rib 22c. As shown in FIG. 3(b), the handle 5 is configured to be attached to a recess portion 21, which is formed on a side surface of a container body 29, along an upward and downward direction of the container body 29.

The grip portion 22 is a portion intended to be gripped by a hand, when holding the container with the handle 20 or the like. The grip portion 22 has a shape of a longitudinally elongated plate (elongated shape) and is provided with positioning holes 23a, 23b formed to allow the fixture pins 7a, 7b of the handle arrangement portion 6 (see FIG. 1(a)) to be inserted therein.

The upper attachment arm 5a of the handle 5 protrudes from an upper side (upper section) of the grip portion 22 and the lower attachment arm 5b protrudes from a lower side (lower section) of the grip portion 22. The upper attachment arm 5a and the lower attachment arm 5b protrude to extend side by side (extend in rows) from the same one side surface of the grip portion 22 transversally. In the present example, the upper attachment arm 5a protrudes from a location which is spaced downward from an upper end of the grip portion 22, and the lower attachment arm 5b protrudes from a lower end of the grip portion 22.

On a lower surface of the upper attachment arm 5a, an inclined surface 24a (an example of the first inclined surface) is formed over a predetermined range from a distal end portion thereof, and on an upper surface of the lower attachment arm 5b, an inclined surface 24b (an example of the second inclined surface) is formed over a predetermined range from a distal end portion thereof. The inclined surfaces 24a, 24b are formed at such an inclination that thicknesses of the attachment arms 5a, 5b are gradually decreased toward the respective distal ends of the arms. In other words, the inclined surfaces 24a, 24b are formed to be inclined toward a center portion of the grip portion 22. In the present example, inclination angles θ1, θ2 of the inclined surfaces 24a, 24b are set to 30° to 45° with respect to the lower surface of the upper attachment arm 5a and the upper surface of the lower attachment arm 5b, respectively. Also, on the distal end portion of the upper attachment arm 5a, a flange-shaped engagement portion 28c protruding upward and to both sides therefrom is formed. The engaging portion 28c is engaged with the container body 29. Meanwhile, an engaging portion 28b and the engaging portion 28c extend to be generally parallel to a center axis Y of the container body 29. In contrast, an engaging portion 28a protrudes to be inclined upward toward an inner side of the container body 29.

On both side end edges of the lower attachment arm 5b, narrowing portions 25a, 25b configured to narrow a width thereof in a curved shape are formed. Also, on both side end edges of the distal end portion of the lower attachment arm 5b, protrusion-shaped engaging portions 26a, 26b configured to be engaged with the container body 29 are formed. Further, on upper and lower end edges of the distal end portion of the lower attachment arm 5b, protrusion-shaped engaging portions 28a, 28b configured to be engaged with the container body 29 are formed. The engaging portion 28a protrudes obliquely upward from the upper end surface of the lower attachment arm 5b, and the engaging portion 28b protrudes perpendicularly (vertically) downward from the lower end surface of the lower attachment arm 5b. In addition, on both side end edges of the lower surface of the lower attachment arm 5b, convex-shaped ribs 27a, 27b extending in a width direction of the lower attachment arm 5b are formed. By forming the ribs 27a, 27b, an arm width of the lower attachment arm 5b on the lower surface side thereof is wider than an arm width on the upper surface side thereof. The ribs 27a, 27b are formed over a region of the narrowing portions 25a, 25b from the distal end portion of the lower attachment arm 5b.

In the present example, the ribs 27a, 27b, which have a thickness substantially equal to or slightly thinner than that of a lower wall (second plate piece 22b) of the lower attachment arm 5b, are formed to extend over a region ranging from a location below the engaging portions 26a, 26b to the narrowing portions 25a, 25b. Also, in the present example, the upper attachment arm 5a of the handle 5 is formed to have a width narrower than that of the lower attachment arm 5b. Therefore, in a top view of the handle 5 as shown in FIG. 2(d), the ribs 27a, 27b of the lower attachment arm 5a appear to protrude from both sides of the upper attachment arm 5a.

As shown in FIG. 3(b), the handle 5 of the above configuration is attached such that the upper attachment arm 5a and the lower attachment arm 5b are respectively engaged with upper and lower portions 21a, 21b of the recess portion 21 of the container body 29 and thus are attached to be oriented toward the inner side of the container body 29 (toward the center axis Y along the upward and downward direction). The attached handle 5 is in a state where the distal end portion of the upper attachment arm 5a protrudes toward a more inner side of the container body 29 than the distal end portion of the lower attachment arm 5*b*. In the state where the handle 5 is attached, a space 30 allowing fingers to be inserted therein is formed between a wall surface section of the container body 29, which defines the recess portion 21, and the grip portion 22.

Next, a method of manufacturing the container with the handle 20 using the mold for a container with a handle 1 will be described with reference to FIGS. 4 to 6.

A bottomed tubular preform 31 is formed in advance by injection molding, for example, using resin such as polyethylene terephthalate (PET). In addition to the preform 31, the handle 5 is also formed in advance by injection molding, using resin, such as polyethylene, polypropylene or polyethylene terephthalate. Meanwhile, in the present example, the preform 31 and the handle 5 are formed of the same material, i.e., polyethylene terephthalate.

Figure 4:
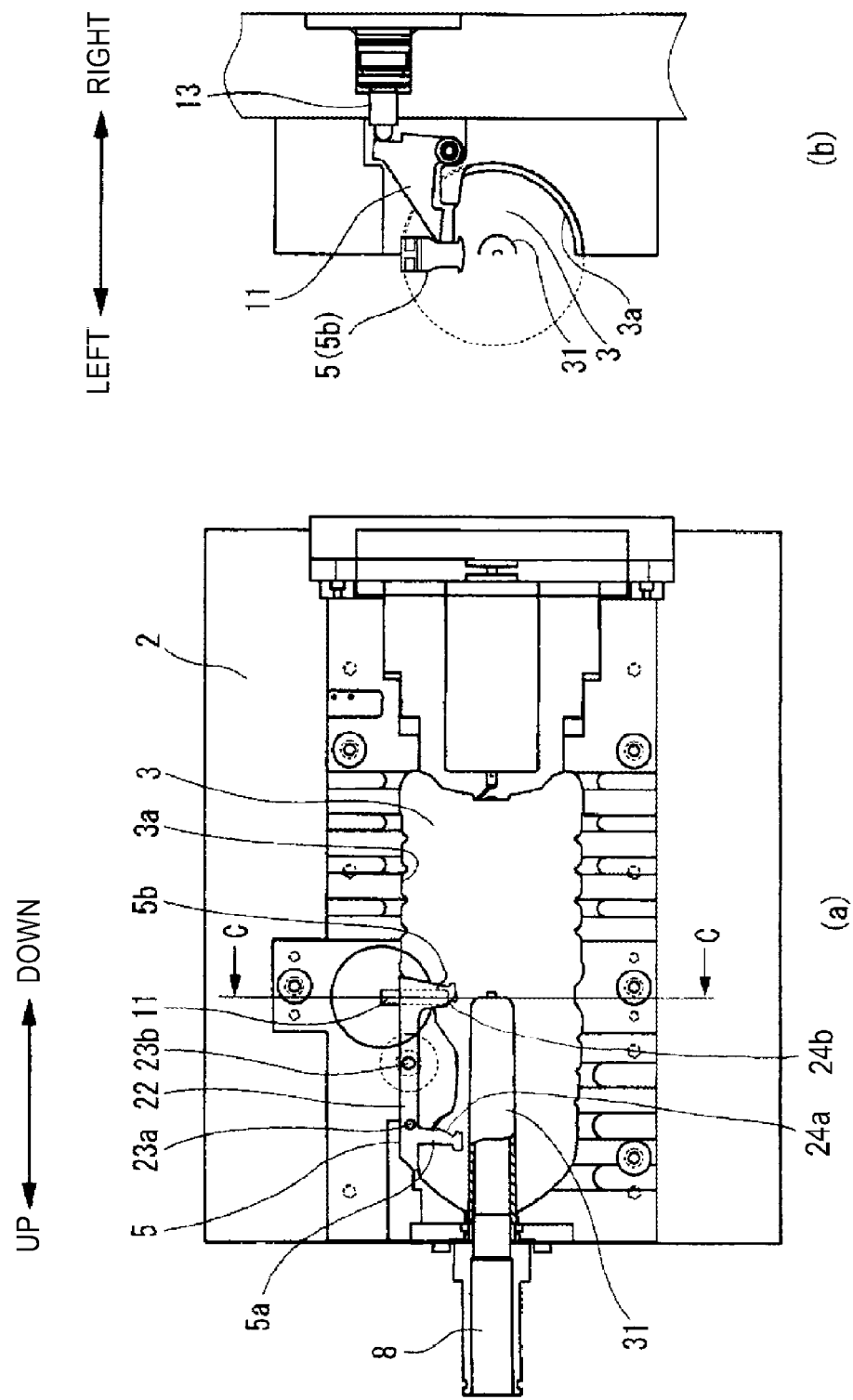
FIG. 4(*a*) is a view showing a state where the handle is arranged in the mold and then a preform is inserted therein, and FIG. 4(*b*) is a sectional view taken along a line C-C in FIG. 4(*a*).

As shown in FIG. 4, handle 5 formed in advance is arranged in the handle arrangement portion 6 of the mold half 2 and then the preform 31, which will become the container body 29, is inserted into the cavity 3 through the insertion portion 8.

The handle 5 is fixed by inserting the fixture pins 7*a*, 7*b* of the handle arrangement portion 6 into the positioning holes 23*a*, 23*b*. The distal end portions of the upper and lower attachment arms 5*a*, 5*b* of the handle 5 are arranged to protrude from the inner wall surface 3*a* of the cavity 3 to the inner side of the cavity 3. The preform 31 is set to straightly extend into the cavity 3 along the vertical center axis of the cavity 3. Also, the preform 31 is inserted in a state where a temperature thereof is adjusted to a temperature suitable for blow-molding. The pressing member 11 is arranged such that the pressing surface 11*a* is positioned outside the inner wall surface 3*a*.

Subsequently, the mold halves 2, 2 are clamped and then blow-molding for forming the container with the handle 20 is started.

Figure 5:
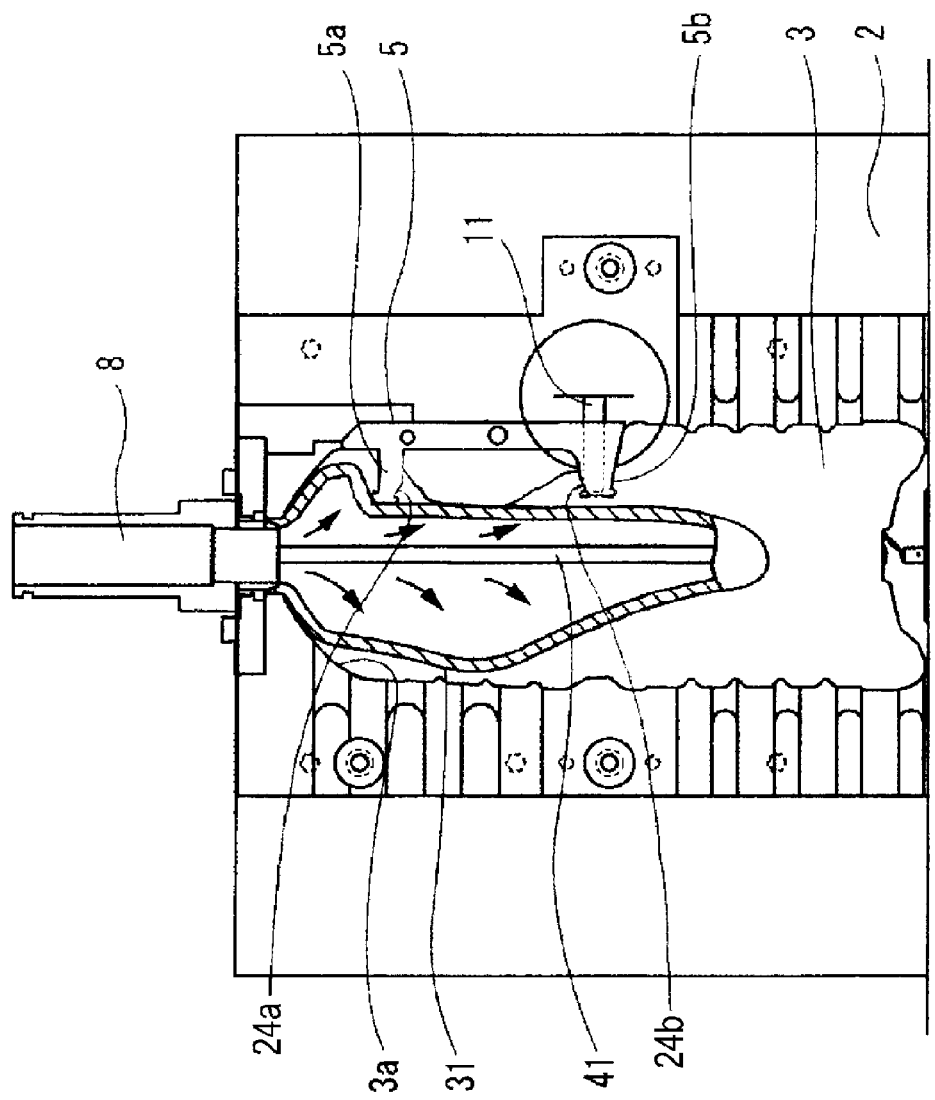
FIG. 5 is a view showing a process in which the preform is being blow-molded.

As shown in FIG. 5, a stretching rod 41 is inserted into the preform 31 through the insertion portion 8 and also a high pressure air is blown therein. The preform 31 is stretched in the vertical center axis as the stretching rod 41 is descended, and also the preform 31 is laterally inflated by the high pressure air blown therein. At this time, the preform 31 is configured to be stretched as the air is introduced therein at the same time as or later than descending of the stretching rod 41. Therefore, the preform 31 abuts and sticks on the inner wall surface 3*a* of the cavity 3 in such a manner that an upper section thereof (a section close to the insertion portion 8) is laterally inflated before a lower section thereof.

Also, the inflating preform 31 gradually comes in contact with the upper attachment arm 5*a* in such a manner that the preform 31 is first covered on the upper attachment arm 5*a* of the handle 5 from the upper side thereof. Then, the preform 31 gradually inflates along the inclined surface 24*a* of the upper attachment arm 5*a* to be engaged with the upper attachment arm 5*a* and also to form the upper portion 21*a* of the recess portion 21 of the container body 29 (see FIG. 3(*b*)).

As the air is further introduced, the preform 31 gradually comes in contact with the lower attachment arm 5*b*, in such a manner that the preform 31 is covered on the lower attachment arm 5*b* and thus is engaged with the engaging portions 26*a*, 26*b*, 28*a*, 28*b* and the like of the lower attachment arm 5*b*. Then, the preform 31 is inflated along the inclined surface 24*b* of the lower attachment arm 5*b* to be engaged with the lower attachment arm 5*b* and also to form the lower portion 21*b* of the recess portion 21 of the container body 29.

Subsequently, in order to securely engage the inflated preform 31 (container body 29) with the handle 5, a handle engagement portion engaged with the lower attachment arm 5*b* of the handle 5 is formed on the container body 29. The handle engagement portion is formed by pressing and deforming a part of the inflated preform 31 with the pressing member 11.

A process in which the container body 29 (inflated preform 31) and the handle 45 are engaged with each other by the pressing member 11 will be described with reference to FIGS. 6(*a*) to (*d*).

Figure 6:
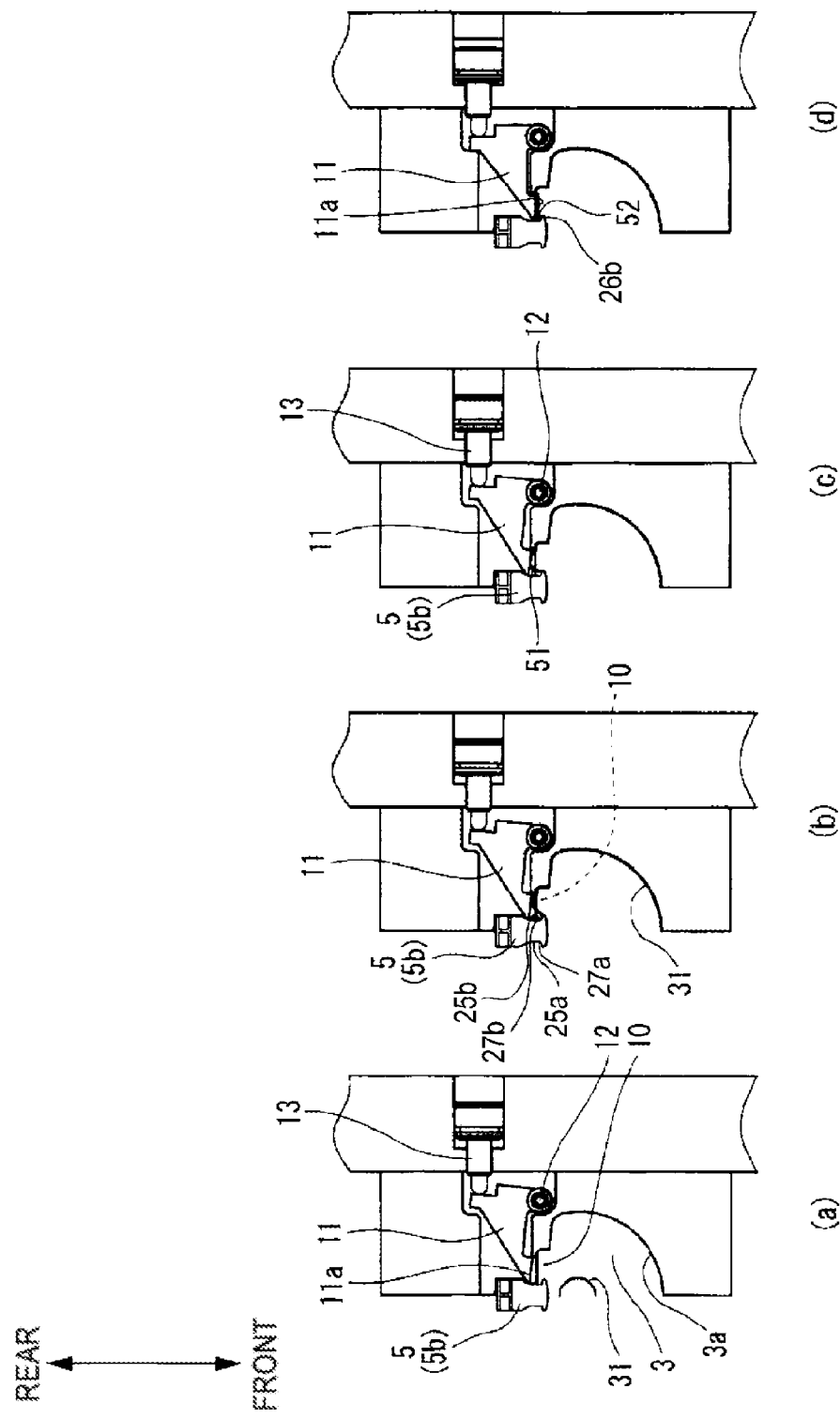
FIGS. 6(*a*) to (*d*) are views showing a process in which the preform and the handle are being engaged with each other by pressing with a pressing member during blow-molding.

As shown in FIG. 6(*a*), when blowing is not started yet, the pressing member 11 is arranged such that the pressing surface 11*a* is positioned outside the inner wall surface 3*a* of the cavity 3. Also, the space 10, in which the inner wall surface 3*a* is absent, is formed around the lower attachment arm 5*b* of the set handle 5.

As shown in FIG. 6(*b*), if the preform 31 is inflated by blowing, the inflated preform 31 sticks to the inner wall surface 3*a*, thereby defining the outer shape of the container body 29. Also, the inflated preform 31 enters the space 10, in which the inner wall surface 3*a* is not present. At this time, the ribs 27*a*, 27*b* reduces an influence of the preform 31, which is being inflated toward the lower attachment atm 5*b* from the lower side of the lower attachment 5*b* (from the front side of the paper surface of FIG. 6(*b*)). At this stage, the preform 31 does not yet enter the narrowing portion 25*b* of the lower attachment arm 5*b*. In addition, the pressing member 11 is still arranged such that the pressing surface 11*a* is positioned outside the inner wall surface 3*a*.

As shown in FIG. 6(*c*), as the air is further blown into the preform 31 by blowing, the preform 31, which has entered the space 10, is inflated outward relative to a location at which the outer shape of the container body 29 is defined. The inflated preform 31 reaches a position coming in contact with the pressing surface 11*a* of the pressing member 11 which is positioned outside the inner wall surface 3*a*. At this time, the hydraulic piston member 13 is driven and thus the pressing member 11 starts to rotate (in the counterclockwise direction in FIG. 6(*c*)). On the other hand, at a start timing of such an operation, the preform 31, which had been inflated and entered the space 10, has not yet entered to the extent of coming in contact with a surface of the narrowing portion 25*b* of the lower attachment arm 5*b*, so that a gap 51 is present between the narrowing portion 25*b* and the preform 31.

In FIG. 6(*c*), the timing, at which the pressing member 11 is driven, can be set as a time point when a predetermined period of time has elapsed after the blow-molding was started. The predetermined period of time may be a time point when the inflated preform 31 has inflated outward relative to the outer shape of the container body 29 in the space 10 and thus the inflated preform 31 has come in contact with (or reached) the pressing surface 11. The timing may be a time point when the inflated preform 31 starts to inflate to (or reached) the outside beyond the location, at which the outer shape of the container is defined.

As shown in FIG. 6(*d*), due to rotation of the pressing member 11, the pressuring surface 11*a* of the pressing member 11 moves to a position forming a section of the inner wall surface 3*a* of the cavity 3 (a section corresponding to the space 10, in which the inner wall surface 3*a* is absent), namely the location at which the outer shape of the container body 29 is defined. As the pressing surface 11*a* moves, a part of the inflated preform 31, which has inflated outward relative to the outer shape of the container body 29, is pushed back to the location, which corresponds to the outer shape of the container body 29. The pushed-back preform 31 is deformed by pressing from the pressing surface 11a and also a part thereof abutting on the pressing surface 11a is formed in a shape corresponding to the outer shape of the container body 29.

Further, the pushed-back preform 31 is also pushed in the narrowing portion 25b of the lower attachment arm 5b and thus enters the gap 51, which is present around the narrowing portion 25b in the state of FIG. 6(c). At a start timing of movement, the pressing surface 11a is inclined as shown in FIG. 6(c) (the left side thereof is up in the figure). However, the pressing surface 11a gradually becomes a horizontal state by rotational movement thereof, thereby pushing the preform 31 into the gap 51.

A part of the pushed-in preform 31, which faces the narrowing portion 25b, is deformed to follow a shape of the narrowing portion 25b, and thus the handle engagement portion 52 capable of being engaged with the protrusion-shaped engaging portion 26b formed on the distal end portion of the lower attachment arm 5b is formed in the part. Namely, in the preform 31, the handle engagement portion 52 configured to be engaged with the engaging portion 26b of the lower attachment arm 5b is formed by a pressure exerted thereon from the pressing member 11. Accordingly, the container body 29 (preform 31) and the handle 5 are securely engaged with each other.

In this way, the container with the handle 20, in which the upper attachment arm 5a and the lower attachment arm 5b are engaged with the side surface of the bottomed tubular container body 29, is manufactured. Meanwhile, although the foregoing embodiment has been described with respect to one mold half 2, a pressing member 11 is also similarly provided on the other mold half 2 and thus the similar blow-molding is fulfilled thereon.

Meanwhile, in a case of manufacturing a container with a handle by blow-molding, a preform, which is being blown, is inflated while coming in contact with attachment arms of a handle arranged to protrude into a cavity. In this case, since a frictional force is generated between the preform and the attachment arms, it is difficult for the inflating preform to slide along surfaces of the attachment arms. Such a difficulty in sliding is likely to occur particularly when the preform and the handle are made of the same material having a high friction coefficient. Therefore, it is difficult for the inflating preform to be attached (wrapped) around the attachment arms, and thus as shown in FIGS. 7(a) and (c), relatively large gaps 53, 55 are often created between the attachment arms and the preform (container body). Also, due to the difficulty in sliding, the preform is likely to be partially thinned. Accordingly, there is a case where an attachment strength of the handle is reduced or a poor molding of the container is caused.

In contrast, according to the handle 5 and the container with the handle 20 of the present embodiment, the inclined surface 24a and the inclined surface 24b are respectively formed on the lower surface of the upper attachment arm 5a and the upper surface of the lower attachment arm 5b, with which the inflating preform 31 is to come in contact. Therefore, even if the handle 5 made of the same material having a high friction coefficient is used, the preform 31 being inflated by blowing smoothly slides along the inclined surface 24a and the inclined surface 24b and thus is gradually attached on the upper attachment arm 5a and the lower attachment arm 5b. Accordingly, as shown in FIGS. 7(b) and (d), a gap 54 created between the upper attachment arm 5a and the preform 31 and a gap 56 created between the lower attachment arm 5b and the preform 31 can be reduced in size. Thus, it is possible to attach the surface of the handle 5 to the side surface of the container body 29 over a wider area, thereby enhancing an attachment strength of the handle 5 to the container body 29. In addition, since the container body 29 and the handle 5 can be formed of the same material, it is possible to enhance recyclability of the container with the handle 20.

Also, when the inflating preform is engaged with the lower attachment arm of the handle, the inflating preform does not gradually come in contact with (is not gradually attached on) the lower attachment arm of the handle from one direction, but from multi-directions, such as above, below, left and right. Therefore, warping (attaching) of the preform around an engaging protrusion (attachment portion), which is formed on a distal end portion of the lower attachment arm, from any one direction is hindered by the inflation of the preform from the other directions, and as a result, there is a case where the preform cannot be smoothly wrapped.

In contrast, according to the present embodiment, the convex-shaped ribs 27a, 27b extending in the width direction of the lower attachment arm 5b are provided on both side ends of the lower surface of the lower attachment arm 5b (see FIGS. 2 and 3). Therefore, an influence of the preform 31, which is being inflated toward the lower attachment arm 5b from the lower side of the lower attachment arm 5b, on an attachment portion can be reduced by the ribs 27a, 27b. Accordingly, it is possible to slow progression of the preform 31, which is progressing toward the narrowing portions 25a, 25b of the lower attachment arm 5b from the lower side of the lower attachment arm 5b, thereby ensuring that the preform 31, which is being inflated from directions other than the lower side, i.e., from both lateral sides, smoothly progresses into the narrowing portions 25a, 25b. Thus, when the preform 31 is pushed back by the pressing member 11, a predetermined amount of the preform 31 can be maintained in a progressed state (prepared state) in the narrowing portions 25a, 25b, thereby ensuring that the preform 31 is securely engaged with the engaging portions 26a, 26b of the lower attachment arm 5b by pushing-back. As a result, it is possible to reduce a size of a gap between the lower attachment arm 5b and the container body 29 and thus to reduce a backlash in a right and left direction (radial direction of the container body 29) or a upward and downward direction, thereby further enhancing an attachment strength of the handle 5 to the container body 29.

Further, since the influence of the preform 31, which is being inflated upward from the lower side, is reduced by the ribs 27a, 27b, it is possible to suppress a stress from multi-directions from being exerted on the preform 31 progressed in the narrowing portions 25a, 25b. Also, it is possible to suppress the preform 31 progressed in the narrowing portions 25a, 25b from excessively being inflated in an irregular form in multi-directions. Therefore, when the preform 31 progressed in the narrowing portions 25a, 25b is pushed back by the pressing member 11, wrinkles created on the handle engagement portion 52 can become smooth (the wrinkles are hardly created). Accordingly, occurrence of breaking of the container body 29 starting from the attachment portion such as the handle engagement portion 52 can be suppressed.

Further, since the upper attachment arm 5a is configured to protrude more toward a center side of the container body 29 than the lower attachment arm 5b, the inflating preform 31 comes in contact with the protruding upper attachment arm 5*a*, and thereby it is possible to delay a timing at which the preform 31 subsequently starts to come in contact with the lower attachment arm 5*b*. Accordingly, the preform 31 can be easily smoothly attached on the lower attachment arm 5*b*.

Meanwhile, the present invention is not limited to the foregoing embodiments, and thus appropriate changes, modifications and the like may be freely made thereto. In addition, the material, shape, dimension, numerical value, form, number, arrangement location and the like of each component of the foregoing embodiments are arbitrary and not limited, as long as the present invention can be achieved.

For example, although in the foregoing embodiments, moving members, such as the pressing member 11 and the piston member 13, are used for manufacturing the container with the handle 20, the present invention is not limited thereto, and may have a configuration in which such moving members are not used.

Although the present invention has been described in detail with reference to the specific embodiments, it will be apparent to those skilled in the art that various changes or modifications can be made without departing from the spirit and scope of the present invention.

This application is based on Japanese Patent Application Serial No. 2015-095716 filed on May 8, 2015, the entire contents of which are incorporated herein by reference.

REFERENCE SIGNS LIST

5: Handle, 5*a*: Upper attachment arm, 5*b*: Lower attachment arm, 20: Container with handle, 21: Recess portion, 22: Grip portion, 24*a*: Inclined surface (an example of the first inclined surface), 24*b*: Inclined surface (an example of the second inclined surface), 25*a*, 25*b*: Narrowing portion, 26*a*, 26*b*, 28*a*, 28*b*, 28*c*: Engaging portion, 27*a*, 27*b*: Rib, 29: Container body

The invention claimed is:

1. A handle configured to be attached on a side surface of a container along an upward and downward direction of the container, the handle comprising:
   an elongated grip portion;
   an upper attachment arm provided on an upper side of the grip portion; and
   a lower attachment arm provided on a lower side of the grip portion,
   wherein on at least a part of a lower surface of a distal end side of the upper attachment arm, a first inclined surface is formed to be inclined toward a center portion of the grip portion,
   wherein on at least a part of an upper surface of a distal end side of the lower attachment arm, a second inclined surface is formed to be inclined toward the center portion of the grip portion,
   wherein a distal end of the first inclined surface on the distal end side is located on the lower surface of the upper attachment arm,
   wherein a distal end of the second inclined surface on the distal end side is located on the upper surface of the lower attachment arm,
   wherein a first engaging portion configured to be engaged with the container is formed at a distal end portion of the upper attachment arm, and the first inclined surface is inclined so that a thickness of the upper attachment arm is gradually decreased toward the first engaging portion in an upper and lower direction, and
   wherein a second engaging portion configured to be engaged with the container is formed at a distal end portion of the lower attachment arm, and the second inclined surface is inclined so that a thickness of the lower attachment arm is gradually decreased toward the second engaging portion in the upper and lower direction.

2. The handle according to claim 1,
   wherein a convex-shaped rib extending in a width direction of the lower attachment arm is provided on a lower surface side of the lower attachment arm.

3. A container with a handle, the container comprising:
   a bottomed tubular container body; and
   the handle including:
      an elongated grip portion;
      an upper attachment arm provided on an upper side of the grip portion; and
      a lower attachment arm provided on a lower side of the grip portion,
   wherein on at least a part of a lower surface of a distal end side of the upper attachment arm; a first inclined surface is formed to be inclined toward a center portion of the grip portion,
   wherein on at least a part of an upper surface of a distal end side of the lower attachment arm, a second inclined surface is formed to be inclined toward the center portion of the grip portion,
   wherein the distal end portions of the upper attachment arm and the lower attachment arm are engaged and integrated with a recess portion formed on a side surface of the container body by blow-molding,
   wherein a distal end of the first inclined surface on the distal end side is located on the lower surface of the upper attachment arm,
   wherein a distal end of the second inclined surface on the distal end side is located on the upper surface of the lower attachment arm,
   wherein a first engaging portion engaged with the container is formed at a distal end portion of the upper attachment arm, and the first inclined surface is inclined so that a thickness of the upper attachment arm is gradually decreased toward the first engaging portion in an upper and lower direction, and
   wherein a second engaging portion engaged with the container is formed at a distal end portion of the lower attachment arm, and the second inclined surface is inclined so that a thickness of the lower attachment arm is gradually decreased toward the second engaging portion in the upper and lower direction.

4. The container with the handle according to claim 3,
   wherein a convex-shaped rib extending in a width direction of the lower attachment arm is provided on a lower surface side of the lower attachment arm.

5. The container with the handle according to claim 3,
   wherein the container body and the handle are formed of a same resin material.

6. The container with the handle according to claim 3,
   wherein the upper attachment arm protrudes more toward a center side of the container body relative to the container body than the lower attachment arm.

* * * * *